Patented Oct. 25, 1949

2,485,640

UNITED STATES PATENT OFFICE 2,485,640

STABILIZED GLYCERIDIC OIL COMPOSITIONS AND PROCESSES OF PREPARING THEM

Hans W. Vahlteich, Englewood, N. J., Chester M. Gooding, Staten Island, N. Y., and Ralph H. Neal, deceased, late of North Bergen, N. J., by Ethel Neal, administratrix, North Bergen, N. J assignors to The Best Foods, Inc., New York, N. Y., a corporation of New Jersey No Drawing. Application December 4, 1948, Serial No. 63,624

19 Claims. (Cl. 99—163)

This invention is a continuation in part of the copending applications, S. N. 608,101 filed July 31, 1945, S. N. 608,102 filed July 31, 1945 and S. N. 608,380 filed August 1, 1945.

This invention relates to glyceridic oil compositions and more particularly to glyceridic oil compositions possessing marked resistance to deterioration.

An object of this invention is to retard the deterioration of glyceridic oils and more particularly hydrogenated and deodorized glyceridic oils.

Another object of this invention is to retard the development of off flavor in glyceridic oils, and particularly glyceridic oils of animal origin.

It is well recognized that glyceridic oils and fats develop rancidity under a variety of conditions. Rancidity of glyceridic oils renders their use, especially for edible products, undesirable and in some cases entirely unsatisfactory. Then, too, with certain glyceridic oils, there sometimes develops an off flavor which is ordinarily called flavor reversion. This development of off flavor appears to be different from the rancidity of the oil and is usually discernible before the rancidity becomes manifest quantitatively. Various means have been proposed to retard the rancidity and the development of flavor reversion in glyceridic oils. For example, it has been recognized that the presence of certain ortho and para, di- and poly-phenolic compounds manifest a primary antioxygenic action on fatty materials, and that other substances, such as polybasic organic acids, reenforce the effect of the phenolic compound present. (H. A. Mattill in Oil and Soap, January 1945, vol. 22, No. 1, page 1.) But since these organic acids are substantially insoluble in glyceridic oils, an effective dispersion of them throughout the mass of glyceridic oil in concentrations which are effective cannot be obtained.

In accordance with this invention, glyceridic oil compositions are provided which do not develop rancidity or flavor reversion over a relatively long period. The compositions of this invention comprise a glyceridic oil, a tocopherol and a mono-alkyl or mono-alkylene ester of citric acid. The amount of the tocopherol present may vary over relatively wide limits, but a concentration of 0.002 to 0.2%, and preferably 0.02 to 0.1%, by weight of tocopherol has been found satisfactory. Likewise, the amount of mono-alkyl or mono-alkylene esters of citric acid may vary, but a concentration of 0.002 to 0.2% and preferably 0.008 to 0.05% by weight of the mono-ester of citric acid is particularly effective. Little advantage is obtained by increasing the concentration of tocopherol above 0.2% by weight.

In some cases, the mono-alkyl or mono-alkylene ester is not readily soluble or miscible to a sufficient degree in the glyceridic oil to produce a substantially homogeneous composition. To disperse such mono-alkyl or mono-alkylene esters throughout the glyceridic oil, an oil-soluble hydrophilic coupling or solubilizing agent is employed. Examples of satisfactory solubilizing agents for this purpose are unsubstituted aliphatic alcohols having at least 6 carbon atoms, mono-carboxylic acids having at least 10 carbon atoms and mono-carboxylic acid mono-esters of glycerol or propylene glycol or their polymers in which the carboxylic acid residue has at least 10 carbon atoms. When an oil-soluble hydrophilic coupling or solubilizing agent is employed, the mono-ester of citric acid is first dissolved in such agent and the resulting mixture is incorporated in the glyceridic oil. The utilization of this hydrophilic coupling or solubilizing agent is particularly advantageous for the dispersion of mono-alkyl or mono-alkylene esters of citric acid in which the alkyl or alkylene group has less than 6 carbon atoms.

The compositions of this invention are prepared by adding the required amount of tocopherol and the mono-alkyl or mono-alkylene ester to the glyceridic oil. If desired, the mono-alkyl or mono-alkylene ester may be initially dissolved in a solubilizing agent and the resulting solution added to the body of the glyceridic oil. Desirably, the oil is agitated to effect the uniform distribution of the tocopherol throughout the body of the glyceridic oil. In determining the amount of tocopherol to be added to the glyceridic oil, the quantity of tocopherol naturally present in the oil should be assayed, and only that amount added which would be required to bring the oil to the desired tocopherol content. Vegetable oils frequently have a sufficiently high tocopherol content so that no added tocopherol is required to produce the compositions of this invention. On the other hand, animal oils, such as lard, usually have an extremely low tocopherol content, and it is required in the case of such oils to add almost the entire tocopherol content to produce the compositions of this invention. The amount of tocopherol in a glyceridic oil may be determined by the Emmerie-Engel method. (Rec. trav. Chim. 57, 1351 (1938).]

The ability of the compositions of this invention to retard rancidity is demontrated by reference to Table 1 which shows the results of a comparative testing, under identical conditions, of lard to which tocopherol and mono-isopropyl citrate was added, the same lard containing mono-isopropyl citrate alone, the same lard containing tocopherol alone and the same lard to which neither tocopherol nor mono-isopropyl citrate was added.

TABLE 1

*Comparison of rancidity retardation of lard both with and without the addition of alpha-tocopherol and mono-isopropyl citrate*

|  | Active Oxygen Test Value—Hours to Rancid Point (End Point—20 Hours Peroxide Value) | | |
|---|---|---|---|
|  | First Determination | Second Determination | Average |
| Lard to which no addition was made (control) | ¾ | ¾ | ¾ |
| Lard to which 0.05% of alpha-tocopherol was added | 9 | 8 | 8½ |
| Lard to which 0.006% of mono-isopropyl citrate was added | 1½ | 1 to 1¼ | 1¼ |
| Lard to which both 0.05% of alpha-tocopherol and 0.006% of mono-isopropyl citrate was added | 13 | 13 | 13 |

The lard used in the comparative testing was deodorized in the laboratory at 200° C. prior to the testing. The testing was conducted by subjecting each sample to aeration at a temperature of about 100° C. for a period of hours until the rancid point was reached in accordance with the method described in Oil and Soap, June 1933, vol. 10, No. 6, pp. 105–9.

These testings demonstrate that a marked synergistic effect is achieved by the combination of the mono-isopropyl citrate and the alpha-tocopherol. Whereas the alpha-tocopherol alone increased the active oxygen value to about 8½ hours and the mono-isopropyl citrate produced only a small increase, when the alpha-tocopherol and mono-isopropyl citrate were both added to lard, the active oxygen value was increased to 13.

The marked improvement in animal oils by the addition of both the alpha-tocopherol and mono-isopropyl citrate is also manifest in flavor stability over a period of time. The increase in flavor stability is shown in Table 2, in which similar samples to those listed in Table 1 were subjected to varying temperatures for a relatively prolonged period and the flavor recorded by food technologists expert in flavor testing.

which alpha-tocopherol alone was added, while manifesting a fair to poor flavor when stored for 27 days at 95° F., had a rank flavor after 42 days at the same temperature. The sample of lard to which mono-isopropyl citrate alone was added had a fair flavor when stored at 95° F. for 27 or 42 days. On the other hand, the sample of lard to which both mono-isopropyl citrate and alpha-tocopherol were added, after storage at 95° F. for 27 days had a fairly good to good flavor, and when stored at the same temperature for 42 days had a fair to fairly good flavor. Furthermore, the sample of lard to which both mono-isopropyl citrate and alpha-tocopherol were added had a good flavor when stored at 45° F. for 27 days. The sample to which alpha-tocopherol alone or to which mono-isopropyl citrate alone was added had merely a fair to fairly good flavor when stored at 45° F. for 27 days. Accordingly, these testings demonstrate that the flavor stability of lard is markedly improved by the addition of both the alpha-tocopherol and the mono-isopropyl citrate over lard to which either of these materials alone is added.

The deodorizer condensate obtained from the deodorization of glyceridic oils of vegetable origin or the refined product from such condensate as obtained for example by the method disclosed in U. S. Patent 2,349,274 (May 23, 1944) or U. S. Patent 2,440,606 (April 27, 1948) has been found to be an excellent and inexpensive source of tocopherol for the production of the compositions of this invention. Such condensates contain substantial amounts of tocopherol and the condensate or refined product thereof may be added to the glyceridic oil to furnish the required tocopherol content to produce the compositions of this invention.

Any glyceridic oil may be employed to produce the compositions of this invention although the greatest advantage is achieved by adding tocopherol and the mono-alkyl or mono-alkylene esters of citric acid to glyceridic oils of animal origin such as lard. However, since some glyceridic oils of vegetable origin after refining and deodorization have relatively low tocopherol contents, additional tocopherol may be added to such oils together with the mono-alkyl or mono-alkylene esters.

Examples of the mono-alkyl and mono-alkylene esters of citric acid which may be used in the composition of this invention are the citric acid mono-esters of the following alcohols:

TABLE 2

*Comparison of flavor of lard both with and without the addition of alpha-tocopherol and mono-isopropyl citrate*

| Addition to lard, if any | Concentration of added agent, per cent | Original Flavor Scorings | Flavor After 27 Days' Storage— | | | Flavor After 42 Days at 95° F. |
|---|---|---|---|---|---|---|
|  |  |  | at 45° F. | at room temp. | at 95° F. |  |
| Alpha-tocopherol | 0.05 | Good | Fairly good | Fair | Fair to poor | Rank. |
| Mono-isopropyl citrate | 0.006 | do | Fair | Fair to poor | Fair | Fair. |
| Mono-isopropyl citrate | 0.006 | do | Good | Fairly good to good. | Fairly good to good. | Fair to Fairly good. |
| Alpha-tocopherol | 0.05 | do |  |  |  |  |
| None—Control |  | do | Poor—strong animal fat. | Poor—strong animal fat. | Poor—strong animal fat. | Poor—strong animal fat. |

A review of Table 2 reveals that the control sample of lard to which neither alpha-tocopherol nor mono-isopropyl citrate was added had a strong animal fat flavor after 27 days at 45° F., at room temperature or at 95° F. The sample of lard to ethanol, propanols, octanols, decanols, dodecanols, hexadecanols, octadecanols, eicosanols, docosanols, octenols, decenols, dodecenols, hexadecenols, octadecenols, eicosenols and docosenols, Examples of tocopherols which may be used in the compositions of this invention are alpha-tocopherol, beta-tocopherol, gamma-tocopherol and delta-tocopherol or mixtures thereof and other tocopherols.

Examples of the mono-carboxylic acid mono-esters of glycerol or propylene glycol or their polymers which may be employed as solubilizing or oil-coupling agents are the mono-stearyl glycerides, mono-oleyl glycerides, mono-lauryl glycerides and mono-palmityl glycerides, or their corresponding propylene glycol esters, poly-glycerol esters, poly-propylene glycol esters or mixtures thereof. These mono-carboxylic acid mono-esters, as commercially prepared, contain substantial amounts of the corresponding mono-carboxylic acid di-esters and small amounts of the corresponding mono-carboxylic acid tri-esters. Such mono-carboxylic acid mono-esters as commercially prepared may be employed as the solubilizing agents in the compositions of this invention. Mono-glycerides prepared from an edible oil, such as cottonseed oil or lard have been found to be very satisfactory solubilizing agents.

Examples of saturated mono-hydric alcohols which may be employed as solubilizing agents are 2-ethylhexyl alcohol, n-octyl alcohol, stearyl alcohol, cetyl alcohol and myristyl alcohol.

Exampes of the fatty acids which may be employed as solubilizing agents are stearic acid, palmitic acid, oleic acid, lauric acid and myristic acid.

A more comprehensive understanding of this invention is obtained by reference to the following typical examples:

*Example 1.—A composition containing mono-isopropyl citrate and tocopherol contained in distillate resulting from deodorization of vegetable oils*

To 100 kilograms of deodorized lard, heated to approximately 80° C., are added 150 grams of a solution of mono-isopropyl citrate dissolved in monoglycerides and 1200 grams of the oil component of the distillate resulting from the deodorization of vegetable oils and containing about 5% of tocopherol. The lard is then preferably agitated to effect uniform distribution of the mono-isopropyl citrate.

The solution of mono-isopropyl citrate in the mono-glycerides is prepared by dissolving a mixture of isopropyl citrates containing about 65% of mono-isopropyl citrate, about 30% of di-isopropyl citrate and about 5% of tri-isopropyl citrate in monoglycerides obtained from the fatty acid of lard in the proportion of about 3 parts of the mixture of isopropyl citrates to about 5 parts of the monoglycerides.

The mixture of mono-isopropyl citrate, di-isopropyl citrate and tri-isopropyl citrate is prepared as follows:

260 grams of anhydrous citric acid are mixed with 130 grams of commercial isopropyl alcohol, and the mixture is heated at 155° C. for 2 hrs. in a closed vessel. The pressure developed by the alcohol corresponds to about 55 lbs. per square inch. The alcohol is then evaporated under reduced pressure with a nitrogen stream at 130° C. A typical acid value of the resulting product is 386 and a typical saponification value is 702. A typical ratio of free carboxyl to total carboxyl is 0.55.

The oil component of the distillate from the deodorization of vegetable oils is obtained in the form of a scum from the oil trap at the base of the barometric condenser in the conventional deodorization apparatus. The scum is heated under pressure to separate the oil from the water. The oil layer contains about 5% tocopherol and may be used without further purification or it may be further purified by alkali refining, esterification of the free fatty acids or other suitable refining procedures. In Example 1, the oil component was used without further purification.

*Example 2.—A composition containing alpha-tocopherol and a mixture of stearyl citrates and oleyl citrates*

To 100 kilograms of neutral lard are added 200 grams of a mixture of stearyl citrates and oleyl citrates and containing about 20% of mono-oleyl or mono-stearyl citrate. 300 grams of natural mixed tocopherols distilled from vegetable oils and containing about 34% mixed tocopherols are also added to the body of the lard. The mixture is preferably heated to approximately 50° C. and agitated to effect substantially uniform distribution of the mixed tocopherols and the mono-oleyl and mono-stearyl citrates throughout the body of the lard.

The mixture of mono-oleyl citrate, mono-stearyl citrate and the corresponding di- and tri-esters together with the mixed citric acid esters of oleyl and stearyl alcohol is prepared as follows:

A mixture of 14 kilograms of commercial oleyl alcohol and 14 kilograms of commercial stearyl alcohol is melted and to this mixture are added 12 kilograms of anhydrous citric acid. During the addition the mixture is agitated. The mixture is heated for a period of about 1¼ hours at 150° C. under reduced pressure. At the end of this period, boiling and foaming cease substantially. The mixture contains mono-stearyl citrate and mono-oleyl citrate to the extent of 20% in toto and the remainder of the mixture consists of their corresponding di- and tri-esters together with the mixed citric acid esters of oleyl and stearyl alcohols.

*Example 3.—A composition containing mono-stearyl citrate and alpha-tocopherols*

To 100 kilograms of butter oil are added 100 grams of mono-stearyl citrate and 50 grams of alpha-tocopherol. The mixture is agitated at about 50° C. to insure substantially uniform distribution of the mono-stearyl citrate and alpha-tocopherol throughout the body of the butter oil. The butter oil may be prepared as described in U. S. Patent 2,414,837 granted to the assignee of L. K. Riggs on January 28, 1947. The resulting butter oil may be formed into butter if desired as described in U. S. Patent 2,414,837.

The mono-stearyl citrate is prepared as follows:

120 grams of anhydrous citric acid are dissolved in 200 grams of refined, dried pyridine containing 1.8 grams of concentrated sulfuric acid by mechanical agitation while heating on the steam bath at about 95° C. 20 grams of pure stearyl alcohol are then introduced into the mixture. The stearyl alcohol is quite insoluble in the reaction product, a condition favoring mono-ester formation since a small concentration of stearyl alcohol in solution is reacted with a large excess of citric acid. The reaction product becomes homogeneous after about 4 hours, after which time the reaction mixture is maintained at 40 to 45° C. for 16 hours.

The reaction mixture is poured into ice water containing 75 grams of concentrated sulfuric acid. The aqueous solution is extracted with ethyl ether, and the ether extract is thoroughly washed with dilute hydrochloric acid and then with water and finally dried with anhydrous sodium sulfate. The ethyl ether solution of mono-stearyl citrate is evaporated, and the residue is crystallized several times from petroleum ether, the boiling range of which is 80° to 112° C.

A typical melting point of the product is from 74° to 88.5° C., probably depending upon the proportion of symmetrical and unsymmetrical mono-esters present. Other typical characteristics are:

|  | Found | Calculated |
| --- | --- | --- |
| Acid Value | 246 | 253 |
| Saponification Value | 358 | 379 |

*Example 4.—A composition containing mono-octyl citrate and tocopherol contained in distillate resulting from deodorization of vegetable oils.*

Mono-octyl citrate and mixed tocopherols contained in the distillate resulting from the deodorization of vegetable oils are incorporated in cottonseed stearine (obtained as a by-product in the winterization of cottonseed oil for salad oil) by initially converting the triglycerides contained in the distillate resulting from vegetable oils to monoglycerides and utilizing the resulting product to dissolve the mono-octyl citrate. 1.2 kilograms of the oil obtained from the distillate resulting from the deodorization of vegetable oils are treated with sufficient glycerine and an alkaline catalyst to convert the triglycerides and the free fatty acids in that distillate to a mixture of mono- and diglycerides. To the resulting product are added 50 grams of a mixture of octyl citrates containing about 20% of mono-octyl citrate. The distillate contained about 2½% of tocopherols. The solution of the octyl citrates in the modified distillate resulting from the deodorization of vegetable oils is added to 100 kilograms of refined and deodorized cottonseed stearine which contained, prior to the addition, about .02% tocopherol. The body of the cottonseed stearine during the addition is maintained at about 40° C. The mixture is then agitated to insure substantially uniform distribution of the mono-octyl citrate and the tocopherol throughout the body of the cottonseed stearine.

A mixture of mono-octyl citrate, di-octyl citrate and tri-octyl citrate is prepared as follows:

150 lbs. of octyl alcohol (commercial 2-ethyl hexanol) were heated in a closed vessel with 137 lbs. of anhydrous citric acid for 6½ hours at 150–155° C. The reaction product comprised three layers, an upper ester layer, a middle aqueous layer and an almost crystalline sludge. The upper oily layer which comprised mono-, di- and tri-octyl citrates was separated and deodorized for about 1½ hours under reduced pressure at 150° C. The odorless and light-colored and limpid product was found to have an acid value of 147.6 and a saponification value of 435 compared with theoretical values for di-octyl citrate of 135 and 405 respectively. The mixture contained about 20% mono-octyl citrate, about 50% di-octyl citrate and the remainder tri-octyl citrate.

The term glyceridic oil composition throughout the description and claims denotes any liquid or solid fat which may or may not be specially processed to attain desirable properties, such as plasticity.

The terms and expressions which we have employed are used as terms of description and not of limitation, and we have no intention, in the use of such terms and expressions, of excluding any equivalents of the features described or portions thereof, but recognize that various modifications are possible within the scope of the invention claimed.

What is claimed is:

1. A composition of matter comprising a glyceridic oil containing substantially no tocopherol, 0.002 to 0.2% of a tocopherol and 0.002 to 0.2% of an ester selected from the class which consists of mono-alkyl esters of citric acid and mono-alkylene esters of citric acid.

2. A composition of matter comprising a glyceridic oil containing substantially no tocopherol, 0.002 to 0.2% of a tocopherol and 0.002 to 0.2% of a mono-alkyl ester of citric acid.

3. A composition of matter comprising a glyceridic oil containing substantially no tocopherol, 0.002 to 0.2% of a tocopherol and 0.002 to 0.2% of a mono-alkylene ester of citric acid.

4. A composition of matter comprising a glyceridic oil containing substantially no tocopherol, 0.02 to 0.1% of a tocopherol and 0.008 to 0.05% of a mono-alkyl ester of citric acid.

5. A composition of matter comprising a glyceridic oil containing substantially no tocopherol, 0.02 to 0.1% of a tocopherol and 0.008 to 0.05% of a mono-alkylene ester of citric acid.

6. A composition of matter comprising a glyceridic oil of animal origin, 0.02 to 0.1% of a tocopherol and 0.008 to 0.05% of a mono-alkyl ester of citric acid.

7. A composition of matter comprising a glyceridic oil of animal origin, 0.02 to 0.1% of a tocopherol and 0.008 to 0.05% of a mono-alkylene ester of citric acid.

8. A composition of matter comprising a glyceridic oil containing substantially no tocopherol and having incorporated therein 0.002 to 0.2% of a mono-alkyl ester of citric acid and the distillate resulting from the deodorization of a vegetable glyceridic oil containing significant amounts of tocopherols, the amount of tocopherols in said composition being 0.002 to 0.2%.

9. A composition of matter comprising a glyceridic oil containing substantially no tocopherol and having incorporated therein 0.002 to 0.2% of a mono-alkylene ester of citric acid and the distillate resulting from the deodorization of a vegetable glyceridic oil containing significant amounts of tocopherols, the amount of tocopherols in said composition being 0.002 to 0.2%.

10. A composition of matter comprising a glyceridic oil containing substantially no tocopherol, 0.002 to 0.2% of a tocopherol and 0.002 to 0.2% of a mono-alkyl ester of citric acid in which the alkyl group has less than 6 carbon atoms and a monoglyceride of a fatty acid having at least 10 carbon atoms.

11. A composition of matter comprising a glyceridic oil containing substantially no tocopherol, 0.002 to 0.2% of mixed tocopherols and 0.002 to 0.2% of mono-isopropyl citrate.

12. A composition of matter comprising a glyceridic oil containing substantially no tocopherol, 0.002 to 0.2% of mixed tocopherols and 0.002 to 0.2% of mono-oleyl citrate.

13. The method of producing a glyceridic oil composition comprising incorporating in a glyceridic oil 0.002 to 0.2% of a tocopherol and 0.002 to 0.2% of a member selected from the class consisting of mono-alkyl esters of citric acid and mono-alkylene esters of citric acid.

14. The method of producing a glyceridic oil composition which comprises incorporating in a glyceridic oil 0.002 to 0.2% of a tocopherol and 0.002 to 0.2% of a mono-alkyl ester of citric acid.

15. The method of producing a glyceridic oil composition which comprises incorporating in a glyceridic oil 0.002 to 0.2% of a tocopherol and 0.002 to 0.2% of a mono-alkylene ester of citric acid.

16. The method of producing a glyceridic oil composition which comprises incorporating in a glyceridic oil 0.02 to 0.1% of a tocopherol and 0.008 to 0.05% of a mono-alkyl ester of citric acid.

17. The method of producing a glyceridic oil composition which comprises incorporating in a glyceridic oil 0.02 to 0.1% of a tocopherol and 0.008 to 0.05% of a mono-alkylene ester of citric acid.

18. The method of producing a glyceridic oil composition which comprises incorporating in a glyceridic oil 0.002 to 0.2% of a mono-alkyl ester of citric acid and an amount of the distillate resulting from the deodorization of a vegetable glyceridic oil containing significant amounts of tocopherols to effect a tocopherol content in said glyceridic oil of 0.002 to 0.2%.

19. The method of producing a glyceridic oil composition which comprises incorporating in a glyceridic oil 0.002 to 0.2% of a mono-alkylene ester of citric acid and an amount of the distillate resulting from the deodorization of a vegetable glyceridic oil containing significant amounts of tocopherols to effect a tocopherol content in said glyceridic oil of 0.002 to 0.2%.

HANS W. VAHLTEICH.
CHESTER M. GOODING.
ETHEL NEAL,
As administratrix of the Estate of Ralph H. Neal, deceased.

No references cited.